United States Patent [19]

Stetson et al.

[11] Patent Number: 5,279,650
[45] Date of Patent: Jan. 18, 1994

[54] CORROSION RESISTANT SEAL COAT COMPOSITION AND METHOD OF FORMING

[75] Inventors: Alvin R. Stetson; William D. Brentnall; Zaher Z. Mutasim, all of San Diego; Lulu L. Hsu, LaJolla, all of Calif.

[73] Assignee: Solar Turbines Incorporated, San Diego, Calif.

[21] Appl. No.: 63,798

[22] Filed: May 20, 1993

Related U.S. Application Data

[63] Continuation-in-part of Ser. No. 891,098, Jun. 1, 1992.

[51] Int. Cl.$^5$ .......................... C09D 5/08; C22C 29/12
[52] U.S. Cl. ................................. 106/141.2; 106/112; 106/14.05; 106/14.21; 75/228; 75/230; 75/232; 75/235; 75/255; 148/22; 148/24; 148/26; 148/261; 148/262
[58] Field of Search ................. 106/1.12, 14.12, 14.21, 106/14.05; 75/228, 230, 232, 235, 255; 148/22, 24, 26, 261, 262

[56] References Cited

U.S. PATENT DOCUMENTS

| | | | |
|---|---|---|---|
| 3,248,249 | 4/1966 | Collins, Jr. | 106/286 |
| 3,248,251 | 4/1966 | Allen | 106/286 |
| 4,319,924 | 3/1982 | Collins, Jr. et al. | 106/14.12 |
| 4,537,632 | 8/1985 | Mosser | 106/14.12 |
| 4,617,056 | 10/1986 | Mosser et al. | 106/14.12 |
| 4,650,699 | 3/1987 | Mosser et al. | 427/240 |
| 4,659,613 | 4/1987 | Mosser et al. | 428/215 |
| 4,699,839 | 10/1987 | Hornberger | 428/312.8 |
| 4,724,172 | 2/1988 | Mosser et al. | 427/383.5 |
| 4,863,516 | 9/1989 | Mosser et al. | 106/14.12 |
| 4,889,558 | 12/1989 | Mosser | 106/14.12 |
| 5,066,540 | 11/1991 | Mosser et al. | 106/14.12 |

Primary Examiner—Anthony Green
Attorney, Agent, or Firm—Robert A. McFall

[57] ABSTRACT

A seal coat composition comprises a slurry consisting essentially of an aluminum neutralized phosphate bonding solution and iron oxide ($Fe_2O_3$) powder. The bonding solution advantageously contains a relatively small but essential amount of vanadium pentoxide and, preferably, magnesium. A process for forming the bonding solution component of the coating slurry includes equilibrating an aqueous phosphate solution with a small but controlled and necessary amount of solute aluminum prior to adding iron oxide powder to form the slurry. The present invention overcomes the problem of bonding solutions which require environmentally disadvantageous chromates or molybdates to neutralize the bonding solution prior to formation of the slurry.

6 Claims, No Drawings

CORROSION RESISTANT SEAL COAT COMPOSITION AND METHOD OF FORMING

This is a Continuation-In-Part of application Ser. No. 7/891,098, filed Jun. 1, 1992.

TECHNICAL FIELD

This invention relates generally to a corrosion and oxidation resistant seal coat composition and a method of forming said coating, and more particularly to a chromium and molybdenum free seal coating containing relatively small but essential amounts of vanadium pentoxide and iron oxide, and a method for forming said seal coating.

BACKGROUND ART

Aluminum metal-phosphate coating compositions for protecting metallic surfaces from oxidation and corrosion, particularly at high temperatures, are well known in the art. For example, U.S. Pat. No. 3,248,25 issued Apr. 26, 1966 to Charlotte Allen teaches a coating composition containing chromium and/or molybdenum to inhibit the reaction between an aqueous, acidic, phosphate component of the composition and a solid particulate metallic material, preferably aluminum powder.

Heretofore, phosphate-aluminum powder coating compositions for protecting metallic surfaces from oxidation and corrosion have been based on an acid-base reaction to neutralize the bonding solution and contain either hexavalent chromium or molybdenum to inhibit the oxidation of metallic aluminum. Both hexavalent chromium and molybdenum are considered toxic chemicals and are therefore environmentally disadvantageous. In particular, hexavalent chromium is rated as a carcinogen. Molybdenum is classified as a toxic heavy metal.

Sealing of metallic surfaces and protective coatings heretofore been difficult In particular, prior coatings have limited oxidation and corrosion resistance at temperatures at elevated temperatures.

The present invention is directed to overcoming the problems set forth above. It is desirable to have a high-temperature oxidation and corrosion-resistant seal coating that does not require either chromates or molybdates to control reaction between the bonding solution and a metal product in the solution, e.g., aluminum. Furthermore, it is desirable to have such a seal coating that has improved resistance to oxidation and corrosion and is stable at elevated temperatures.

DISCLOSURE OF THE INVENTION

In accordance with one aspect of the present invention, a seal coat composition consists essentially of a mixture of a bonding solution and iron oxide ($Fe_2O_3$) powder, in a ratio of about 100 ml of the bonding solution to from about 10 to about 30 g of the $Fe_2O_3$ powder. The bonding solution consists essentially, by weight, of about 47% to about 80% $H_2O$, about 15% to about 35% $H_3PO_4$, less than about 20% of at least one magnesium compound selected from the group comprising $MgCO_3$ and MgO, from about 0.5% to 3.0% $V_2O_5$, and aluminum in solution in an amount sufficient to substantially equilibrate said bonding solution with respect to aluminum.

In another aspect of the present invention, a method of forming a seal coat material, comprises mixing together about 500 to about 900 parts by weight water and about 150 parts by weight $H_3PO_4$ and forming a dilute phosphoric acid solution Aluminum, either in its elemental form or as a compound, is added in an amount sufficient to substantially equilibrate the dilute phosphoric acid solution with respect to aluminum. Magnesium, either as a carbonate or oxide in an amount less than about 120 parts by weight, may also be added to the mixture. Vanadium pentoxide is added in an amount of from about 1 to about 30 parts by weight. The mixture is stirred, or agitated, for a period of time sufficient to permit completion of the reaction of the added compounds with phosphoric acid, and form a bonding solution that is substantially equilibrated with respect to aluminum. The equilibrated bonding solution is then mixed with iron oxide ($Fe_2O_3$) powder to form a slurry containing about 5 g to 30 g of iron oxide powder for each 100 ml of the neutralized bonding solution.

BEST MODE FOR CARRYING OUT THE INVENTION

In the preferred embodiment of the present invention, an oxidation and corrosion resistant coating composition for metallic surfaces consists essentially of a bonding solution neutralized by an oxidation-reduction reaction, and finely divided iron oxide ($Fe_2O_3$) particles.

The bonding solution component of the coating embodying the present invention requires that it contain sufficient aluminum in solution so that it is substantially equilibrated with respect to aluminum, i.e., that the amount of aluminum in solution be substantially at the saturation point.

Aluminum powder (Al), alumina ($Al_2O_3$) or aluminum hydroxide ($Al[OH]_3$) may be used to provide equilibration of the bonding solution. If alumina or aluminum hydroxide are selected, it is desirable to heat the mixture to increase the reaction rate. Magnesium, while not essential, may desirably be used to at least partially neutralize, i.e., reduce the acidity, of the aqueous phosphoric acid mixture either before or after equilibration of the mixture with aluminum. It has also been found that the addition of a relatively small, but essential, amount of vanadium pentoxide ($V_2O_5$) to the bonding solution significantly enhances the oxidation and corrosion resistance properties of the coating following exposure to a high temperature environment, such as that found in the compressor section of a gas turbine engine during operation of the engine.

Preferably, the bonding solution includes either magnesium carbonate ($MgCO_3$) or magnesium oxide (MgO), and has a composition consisting essentially of, by weight, from about 47% to about 80% $H_2O$, from about 15% to about 35% $H_3PO_4$, less than about 20% of either $MgCO_3$ or MgO, 0.1% to about 3.0% $V_2O_5$, and from about 0.1% to about 3.5% aluminum in solution. If magnesium, either as a carbonate or oxide, is not used as an aid to neutralization of the bonding solution, aluminum in amounts represented by the upper limits of the above stated ranges will be required to sufficiently neutralize the phosphoric acid solution and also equilibrate the solution with respect to aluminum As used herein, the formula "$H_3PO_4$" is used with reference to absolute, or 100% pure, full strength phosphoric acid; the term "phosphoric acid" without other qualification means the 75% (industrial) strength phosphoric acid that is commonly commercially available; and the term "phosphoric acid solution" is used to identify a water-diluted solution of phosphoric acid.

When $MgCO_3$ is used as a neutralizing agent, the bonding solution desirably has a composition consisting essentially of, by weight, from about 47% about 67% $H_2O$, from about 27% to about 35% $H_3PO_4$, no more than about 20% $MgCO_3$ from about 0.1% to about 3.0% $V_2O_5$, and from about 0.1% to about 3.5% aluminum in solution. Preferably, the magnesium carbonate neutralized bonding solution consists essentially of, by weight, about 62% $H_2O$, about 27% $H_3PO_4$, about 9% $MgCO_3$ about 1.7% $V_2O_5$, about 2% $Al(OH)_3$ and about 0.2% aluminum powder.

When, MgO is used as the neutralizing agent, the composition desirably consists essentially of, by weight, from 52% to about 80% $H_2O$, from about 15% to about 35% $H_3PO_4$, no more than about 10% MgO, from about 0.1% to about 3.0% $V_2O_5$, and from about 0.1% to about 3.5% aluminum in solution. Preferably, the bonding solution partially neutralized with MgO consists essentially of, by weight, about 65% $H_2O$, about 25% $H_3PO_4$, about 4% MgO, about 1.7% $V_2O_5$, about 3.4% $Al(OH)_3$ and about 0.3% aluminum powder.

In accordance with the present invention, the bonding solution component is formed by diluting $H_3PO_4$, with water, in a ratio in parts by weight, of from about 500 to 900 parts water to 147 parts $H_3PO_4$. In the preferred embodiment of the present invention, the above proportions are met by mixing 196 parts of 75% industrial grade phosphoric acid with 650 parts water.

After mixing, the diluted phosphoric acid solution is heated to it's boiling point, and aluminum then added in an amount sufficient to substantially equilibrate the solution with respect to aluminum. Only a relatively small amount of elemental aluminum such as powdered aluminum or aluminum strips, for example from about 10 to about 70 parts by weight, is required for this purpose. If an aluminum compound, such as alumina or aluminum hydroxide is selected to provide solute aluminum in the mixture, amounts of such compounds should be added to provide from about 0.1% to about 3.5% aluminum in solution.

In the preferred embodiment, about 20 parts by weight, of aluminum hydroxide is slowly added to the boiling phosphoric acid solution, boiled together for a period of time, typically 3 to 10 minutes, sufficient to dissolve the $Al(OH)_3$, and then removed from the heat source.

After the addition of aluminum, either magnesium carbonate, magnesium oxide, or mixture thereof is desirably added, in addition to an essential amount of vanadium pentoxide, to the aluminum-equilibrated mixture. If magnesium carbonate is selected, less than 120 parts, by weight, and preferably about 50 parts, are added to the mixture. If magnesium oxide (magnesia) is selected, less than 50 parts, by weight, and preferably about 24 parts, are added. In the present invention, vanadium pentoxide in a amount of from about 1 to about 30 parts, by weight, and preferably about 10 parts is added to the mixture.

The optional magnesium compounds and the required vanadium pentoxide additions are preferably mixed into the aluminum equilibrated solution in the following order. A portion of the magnesium (for example about 40%) is slowly added while stirring to the hot, but not boiling, equilibrated solution. This mixture is stirred until the added magnesium compound is completely dissolved, for example about 10 minutes. The solution is then again heated to boiling and the vanadium pentoxide is slowly added while stirring. Heating and stirring are continued, typically for at least 10 minutes, until the solution is free of undissolved solids. The solution is then again removed from the heat source and the remaining MgO is slowly added while continuously stirring. When the solids are completely dissolved, or the solution shows only trace amounts of solids, the solution should again be heated to boiling for 1 minute and then removed from the heat source.

It is desirable to add a small amount, for example about 2 parts by weight, of aluminum to the hot solution to assure complete equilibration of the mixture with respect to aluminum. A fine aluminum powder, such as Alcoa Type 201, is suitable for this purpose, and should be stirred into the solution for about one minute.

The solution should then be cooled to about 60° F.-80° F. (16° C.-27° C.) and measurements made of pH and density. Preferably, pH should be between 2.8 and 3.4 and density should be between 1.28 and 1.32 g/ml. Control of pH will maximize the shelf life of the subsequently formed slurry and minimize reaction of the coating with carbon steel substrates. If the pH is lower than 2.8, additional Magnesium (either oxide or carbonate) should be added to reduce the acidity of the mixture and bring it into the desired range. Generally this will require the addition of less than 3 g of MgO. The solution should be stirred for a least 5 minutes after the last addition.

Ideally, the solution is initially made to the desired density. However, due to the boiling required in the introduction of the aluminum hydroxide and the vanadium pentoxide, significant water is lost in solution preparation. Also, the type and size of mixing container and the heat source will effect the amount of water remaining in the solution. Therefore, it may be necessary to adjust the density of the bonding solution if it is outside the desired range of 1.28 to 1.32 g/ml. Preferably, a higher or lower density modifying solution is prepared by adding less or more water in the initial preparation stage. The modifying solution is then added to adjust the density of the bonding solution to the desired range. Alternatively, a low density solution can be boiled to drive off water and achieve the desired density. However, a high density solution must be diluted by the addition of a low density modifying solution because direct addition of water to the bonding solution will cause precipitation.

After assurance that the pH and density of the solution are within the desired limits, the solution should be allowed to settle for 24 hours and filtered before using.

The seal coat composition embodying the present invention is then formed by mixing the above described equilibrated bonding solution with very fine iron oxide ($Fe_2O_3$) powder. The iron oxide powder desirably has a nominal particle size of from about 0.15 $\mu$m to no more than about 0.5 $\mu$m. Preferably the powder is milled for a period of time sufficient to breakup any agglomerates.

Iron oxide powder is added to the bonding solution in a ratio of from about 5 g to about 30 g, and preferably about 20 g, of the iron oxide powder for each 100 ml of the bonding solution. The bonding solution-iron oxide slurry mixture is then preferably placed in a ball mill and milled for about 24 hours. The milled mixture should be strained through a 325 mesh sieve prior to using to assure removal of any solution aggregates.

The slurry is typically applied to a metallic surface or over a previously applied protective coating such as the coating described in the parent application of the present invention, by dipping or spraying, with spraying being the preferred process. The seal coat is preferably applied as a single coat having a thickness of about 0.2 mils (5 μm). The coating is preferably air dried at 70° F. (21° C.) for at least 30 minutes, oven dried in an open oven at about 130° F. (54° C.) for about 30 minutes, and then dried in a closed oven environment at 175° F. (79° C.) for at least an additional 30 minutes. The seal coat is then cured by heating to 650° F. (343° C.) for 60 minutes.

If desired, an additional coat of the bonding solution, without the iron oxide addition, can be applied over the above seal coat to provide increased surface smoothness.

INDUSTRIAL APPLICABILITY

The chrome and molybdenum-free seal coating embodying the present invention is particularly useful for providing corrosion and oxidation protection to aluminum and aluminum-containing surfaces operating at elevated service temperatures, such as the compressor blades, stators, and casings of gas turbine engines.

A number of test specimens were prepared to compare the seal coating embodying the present invention with the seal coating described above but without the addition of iron oxide, as described above but without the addition of vanadium pentoxide in the bonding solution, with seal coatings formed according to the parent application, i.e., without either iron oxide or vanadium pentoxide, and with current commercially available and accepted seal coatings which undesirably contain chromium or molybdenum. All of the seal coatings were applied over two base coats containing aluminum.

The test specimens were inspected for surface appearance and roughness, and tested for conductivity, mechanical properties including resistance to spalling and bond strength, thermal stability, resistance to oxidation, and resistance to corrosion at elevated temperatures. The seal coatings embodying the present invention were found to be superior to all of the other seal coatings tested. In particular, the seal coating formed of the slurry containing iron oxide ($Fe_2O_3$) and an aluminum equilibrated bonding solution containing vanadium pentoxide, as set forth above, had a smoother surface finish and significantly better high temperature oxidation and corrosion resistance than the similar seal coatings without either one or both of the iron oxide or vanadium pentoxide additions, or the prior art coatings containing chromium or molybdenum.

While the invention has been described with reference to certain preferred embodiments, those skilled in the art recognize that certain common substitutions may be made without altering the essential properties of the claimed coating composition. For example, while water is specified in the above examples illustrating the preferred embodiment, other common solvents such as alcohol, acetone, or similar liquids, may be substituted for a portion of the water in the claimed mixtures without departing from the spirit of the invention.

Other aspects, objects and advantages of this invention can be obtained from a study of the disclosure and the appended claims.

What we claim is:

1. A seal coat composition, consisting essentially of a slurry mixture of a bonding solution and iron oxide ($Fe_2O_3$) powder in a ratio of about 100 ml of the bonding solution to from about 5 g to about 30 g of the iron oxide powder, said bonding solution consisting essentially of, by weight, from about 47% to about 80% $H_2O$, from about 15% to about 35% $H_3PO_4$, less than about 20% of at least one magnesium compound selected from the group consisting of $MgCO_3$ and $MgO$, from about 0.1% to about 3.0% $V_2O_5$, and aluminum in an amount sufficient to substantially equilibrate said bonding solution with respect to aluminum.

2. The seal coat composition, as set forth in claim 1, wherein the ratio of the iron oxide powder component of the slurry mixture is about 20 g to each 100 ml of the bonding solution.

3. The seal coat composition, as set forth in claim 1, wherein said iron oxide powder component of the slurry mixture is an iron oxide powder having a mean particle size of less than about 0.5 μm.

4. A method of forming a seal coat slurry mixture, comprising the steps of:
   mixing together from about 500 to about 900 parts by weight of water and 147 parts by weight $H_3PO_4$ and forming a dilute phosphoric acid solution;
   adding an aluminum compound, selected from the group consisting of metallic aluminum powder, aluminum oxide and aluminum hydroxide, in an amount sufficient to substantially equilibrate said dilute phosphoric acid solution with respect to aluminum;
   adding from 0 about 120 parts by weight of at least one magnesium compound selected from the group consisting of magnesium carbonate and magnesium oxide;
   adding from about 1 to about 30 parts by weight of vanadium pentoxide to form a mixture:
   stirring said mixture for a period of time sufficient to permit the substantially complete reaction of said-added compounds with phosphoric acid; and forming a neutralized bonding solution that is substantially equilibrated with respect to aluminum;
   mixing said neutralized bonding solution with iron oxide ($Fe_2O_3$) powder in an amount sufficient to form a slurry containing from about 5 g to about 30 g of iron oxide powder for each 100 ml of the neutralized solution.

5. A method of forming a seal coat slurry, as set forth in claim 4, wherein said iron oxide powder is mixed with said neutralized bonding solution in an amount sufficient to form a slurry containing about 20 g of iron oxide powder for each 100 ml of said neutralized bonding solution.

6. A method of forming a seal coat slurry, as set forth in claim 4, wherein said iron oxide powder mixed with said neutralized bonding solution has a mean particle size of less than about 0.5 μm.

* * * * *